United States Patent
Qiu et al.

(10) Patent No.: US 8,103,627 B1
(45) Date of Patent: Jan. 24, 2012

(54) BOUNCE ATTACK PREVENTION BASED ON E-MAIL MESSAGE TRACKING (75) Inventors: Peng Qiu, Nanjing (CN); Kang Chen, Nanjing (CN); Fei Zou, Nanjing (CN)

(73) Assignee: Trend Micro, Inc., Tokyo (JP)

( * ) Notice: Subject to any disclaimer, the term of this patent is extended or adjusted under 35 U.S.C. 154(b) by 272 days.

(21) Appl. No.: 12/396,169

(22) Filed: Mar. 2, 2009

(51) Int. Cl.
*G06F 17/00* (2006.01)
(52) U.S. Cl. .................................. 707/613; 709/206
(58) Field of Classification Search .............. 707/609, 707/613, 705, 802, 821; 709/204, 206, 207, 709/246; 713/151, 154, 155
See application file for complete search history.

(56) References Cited

U.S. PATENT DOCUMENTS

2008/0270545 A1* 10/2008 Howe ............................ 709/206

OTHER PUBLICATIONS

Amir Herzberg, Cryptographic Protocols to Prevent Spam, Bar Ilan University, Isreal, Sep. 21, 2005, pp. I-XLIII.*

Liao et al.; "Techniques for Defending an Email System Against Malicious Sources"; U.S. Appl. No. 11/414,120, filed Apr. 28, 2006.

* cited by examiner

*Primary Examiner* — Fred I Ehichioya
(74) *Attorney, Agent, or Firm* — Beyer Law Group LLP (57) ABSTRACT

Information such as message identifier, sender, recipient, timestamp, etc., are recorded in a record in a local database as an e-mail message is sent out. A DSN counter is set equal to the total number of recipients, thus allowing returned messages to be compared against this counter to thwart a capture/replay attack. When a DSN message is received at the computer system it includes the originally sent e-mail message. The DSN message may be legitimate or it may be a faked DSN message. The system searches the local database for a record having information that matches with the returned e-mail message. If a match exists, the DSN message is legitimate and it is delivered to the original sender. If no match exists, then the DSN message has been faked and appropriate action is taken. When a match occurs, a match count value is incremented for that record and compared against the originally stored DSN count value. If the number of received DSN messages is greater than the original number of recipients, then a capture/replay attack has occurred and appropriate action is taken.

20 Claims, 5 Drawing Sheets

Incoming E-mail Processing

| 310 | 320 | 330 | 340 | 350 | 360 |
|---|---|---|---|---|---|
| Message ID | Sender | Recipient | Time Stamp | DSN Count | Match Count |
| 66D698438D A0CC4C8DCB C2E00A20F5 DEC8FF570 X.com | userX@X.com | userY1@Y.com userY2@Y.com | 28OCT2008 07:51:28:0378 (UTC) | 2 | 0 |

Message Record

FIG. 5

Incoming E-mail Processing

BOUNCE ATTACK PREVENTION BASED ON E-MAIL MESSAGE TRACKING

FIELD OF THE INVENTION

The present invention relates generally to e-mail spam prevention. More specifically, the present invention relates to a technique for preventing an e-mail bounce attack.

BACKGROUND OF THE INVENTION

Electronic mail ("E-mail") is currently a popular means of communication between individuals with access to a computer network, such as the Internet. E-mail is convenient and fast, and is relied upon extensively by businesses and home computer users. Unfortunately, some legitimate advertisers, unscrupulous individuals and hackers have resorted to mass mailings of advertisements ("spam") the e-mail. This spam is sent to computer users using various means whether they have asked for these messages are not, and includes any unsolicited e-mail message in addition to advertisements. Spam is definitely an economic burden on businesses because it clogs computer systems and results in loss of productivity, and is certainly more than a nuisance to the home computer user.

Figure 1:
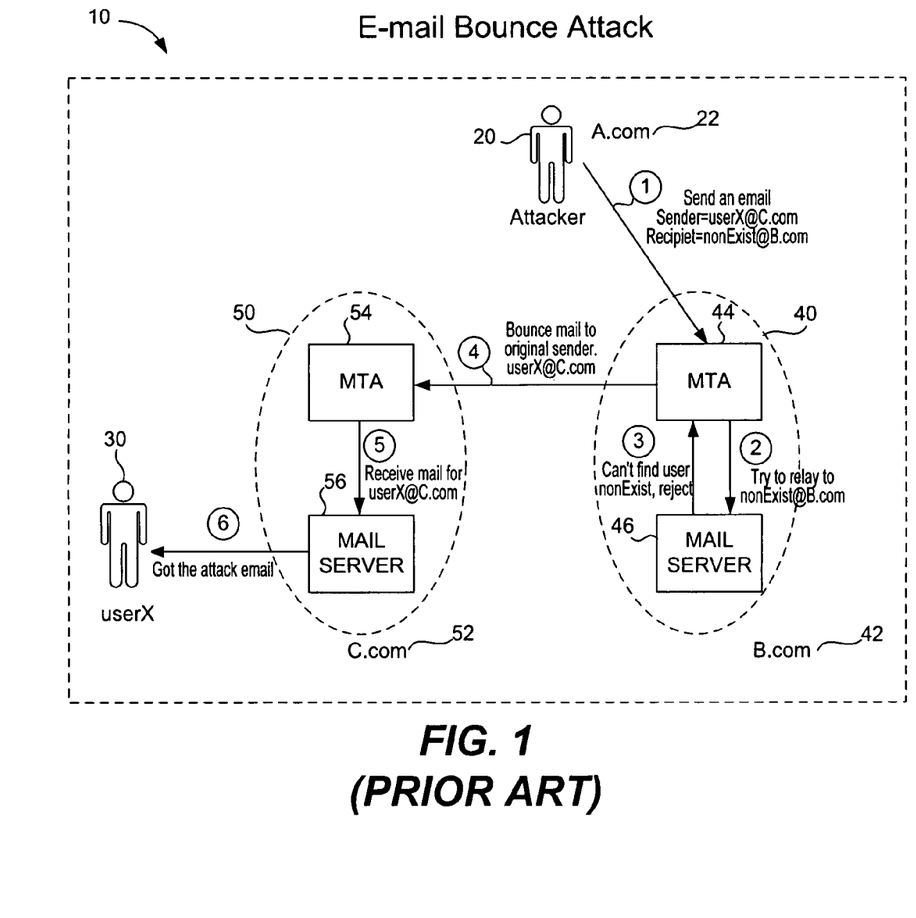
FIG. 1 illustrates how a prior art bounce attack works.

One technique used by these individuals to propagate spam is known as the e-mail "bounce attack." The bounce attack is now a problem for e-mail security and efforts are under way to prevent it. FIG. 1 illustrates how a prior art bounce attack works.

Shown is an attacker 20 attempting to deliver spam e-mail to an innocent user 30 via server computers 40 and 50 over the Internet. The attacker operates from a server computer hosting domain 22 "A.com" and begins by sending a message 1 from that domain to the domain 42 "B.com." This first message is sent to a recipient in domain 42 who does not exist, "nonexist@B.com," and includes a fake sender address, userx@C.com. Of course, user 30 has not sent this message but it is the attacker's intention that user 30 will receive an unsolicited mail message. The mail transfer agent (MTA) 44 receives this first message and attempts to deliver this message 2 to mail server 46. Of course, this delivery will fail since the recipient does not exist, and a message 3 is sent from the mail server back to the MTA 44 indicating that delivery has been rejected since the e-mail account (and user) does not exist.

Because delivery has failed, MTA 44 generates a delivery status notification (DSN) and attempts to send the notification 4 to who it thinks is the original sender, userx@C.com. This message 4 is routed from MTA 44 to the MTA 54 within domain 52, C.com, and is termed the bounce e-mail message. The message is then routed 5 from the MTA to mail server 56 and then delivered 6 to the unsuspecting user 30. If MTA 54 and mail server 56 do not do any kind of screening or checking for spam then user 30 will receive this bounce e-mail spam even though he or she never sent the message in the first place to the nonexistent user at computer 40.

This is one example of how a bounce e-mail attack is implemented. In a real environment, the bounce message may also include an attachment with malicious content such as a computer virus, a phishing attack, etc. A denial of service attack may also be implemented using bounce e-mail messages. A bounce e-mail attack causes problems because: the user receives spam or phishing messages; a denial of service attack may be launched; it is hard to track the original attacker; and unnecessary e-mail storage results if the victim stores all incoming messages.

It would be desirable to find a technique to counter a bounce e-mail attack that addresses the problems in the prior art and that does not have any of the disadvantages associated with other proposed solutions.

SUMMARY OF THE INVENTION

To achieve the foregoing, and in accordance with the purpose of the present invention, a bounce prevention system is disclosed that thwarts an e-mail bounce attack.

In a first embodiment, the method involves storing information locally within the computer system as an e-mail message is sent out from the computer system to a user or users in another domain. Information such as the message identifier, sender, recipient, timestamp, etc., may be recorded as a record in a local database. A DSN counter is set equal to the total number of recipients of the e-mail message, thus allowing returned messages to be compared against this counter to thwart a capture/replay attack. Any incoming DSN message will be compared against records in the database to determine if the incoming e-mail message attached to the DSN message was actually sent out from this computer system to begin with.

In a second embodiment, a DSN (delivery status notification) message is received within a computer system and includes information regarding an e-mail message originally sent from a sender to a recipient. The DSN message may be a legitimate message indicating returned e-mail from the computer system, or may be a fake DSN message perpetuated by a hacker in which the attached e-mail message did not actually originate from a computer system. The system begins by searching a local database of the computer system for a record having information that matches with the incoming e-mail message attached to the DSN message. A match may be performed by checking fields such as message identifier, timestamp, etc., or any combination of fields in the record. If it is determined that a match exists, then the DSN message is legitimate and the DSN message is delivered to the original sender. If no match exists, then it is determined that the DSN message has been faked an appropriate action is taken.

Optionally, when a match occurs, a match count value is incremented for that record and compared against the originally stored DSN count value. If the number of received DSN messages is greater than the original number of recipients, then it is likely that a capture/replay attack has occurred an appropriate action is taken. For example, the DSN message is not delivered to the user. Alternatively, the message may still be delivered to the user and a flag or other warning is raised.

A third embodiment includes a combination of the first and second embodiments in which an outgoing message is recorded in a local database, the outgoing message is bounced back as a DSN message because no recipient exists, the system determines that the DSN message is legitimate, and the DSN message is delivered to the original sender.

A fourth embodiment relates to the bounce prevention system itself. The system operates within a computer system; it includes a mail server, a mail transfer agent, and a local database that records information relating to all outgoing e-mail messages sent to a different domain. The system may include a modified mail transfer agent that performs steps of the present invention, or the system may include a standard mail transfer agent along with a separate module operating in conjunction with the mail transfer agent that perform steps of the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As described above, a bounce e-mail attack is disruptive and causes many problems for computer users and enterprises. In this type of attack, the attacker sends an e-mail message to a mail transfer agent with a faked sender address and a nonexistent recipient; the mail transfer agent then bounces a delivery status notification to an innocent user at the sender address who then becomes the victim.

One proposed approach to the e-mail bounce attack is known in the industry as the "bounce address tag validation" (BATV) method. Basically, this method determines whether the bounce sender address specified in an e-mail message is valid. Currently, this method is the subject of an IETF draft in the latest version was released May 21, 2008. It is not a mature standard but is a proposed solution that is still evolving. A review of this method and its disadvantages will be useful in understanding the advantages of the present invention.

Figure 2:
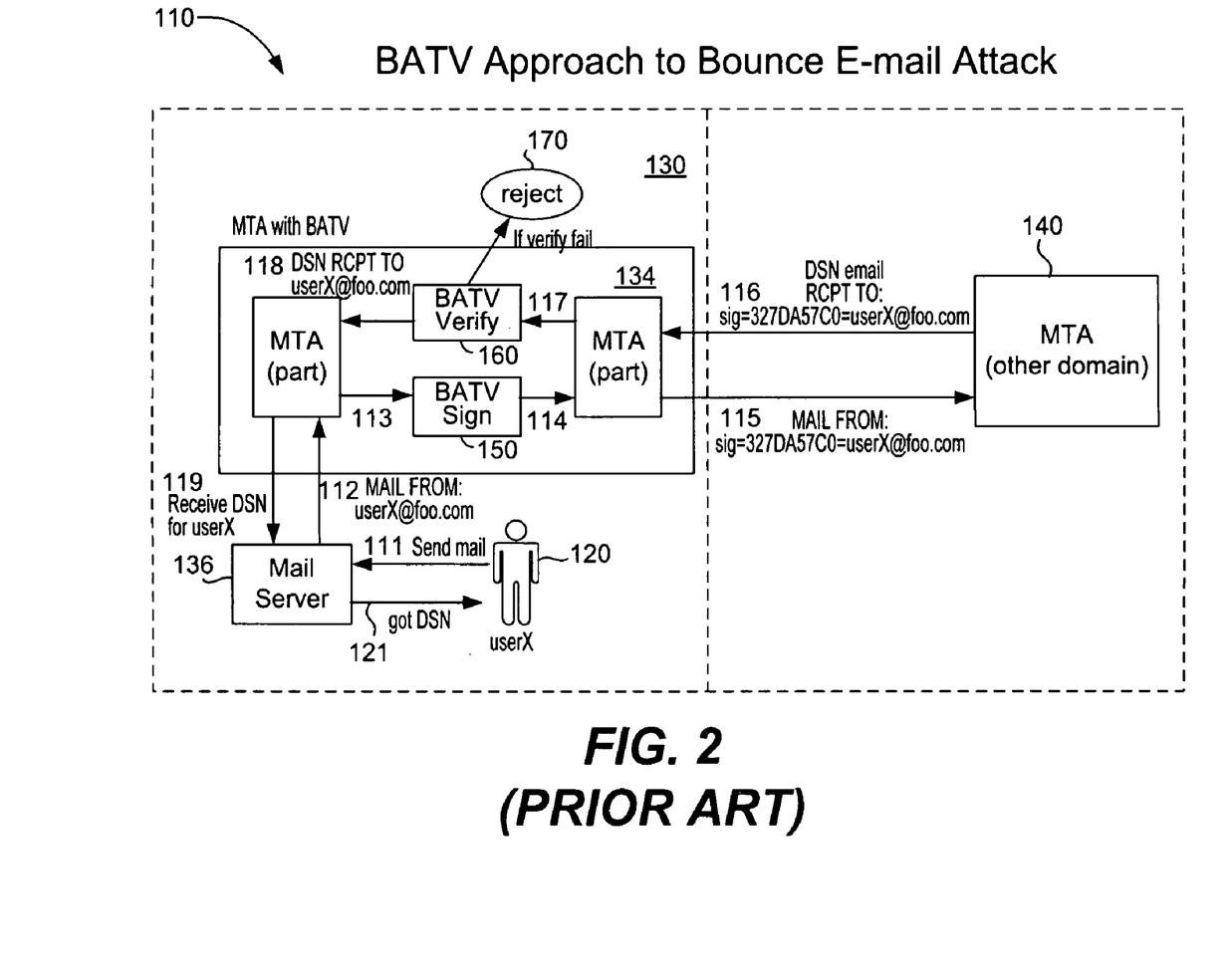
FIG. 2 illustrates the BATV approach to a bounce e-mail attack.

FIG. 2 illustrates the BATV approach to a bounce e-mail attack 110. Shown is a user 120 communicating via a computer system 130 over the Internet to a remote server computer that includes a mail transfer agent 140. Computer system 130 includes an MTA 134 (shown here having two parts) and a mail server 136. The MTA also includes a BATV sign module 150 and a BATV verify module 160 that implement the BATV functionality to counter any bounce e-mail attack.

For outgoing messages, the process begins when the user sends a message 111 to its mail server. The mail server delivers the message 112 to the MTA 134 having a sender address identifying user 120. This message is then delivered 113 to the BATV sign module 150. For every outgoing e-mail message, the BATV sign module 150 calculates a unique signature for the sender using a particular algorithm and appends the signature to the original message, thus changing the sender address from its original value to the unique signature. This message is then sent 114 via the MTA out over the Internet 115 to arrive at the remote server MTA 140. The delivered message thus includes a unique signature identifying the sender, the idea being that if such a message were to be bounced back, it would be easy to identify that the message did in fact originate at computer system 130 and is not a bounce e-mail attack.

Accordingly, should this e-mail message 116 be returned from MTA 140 back to computer system 130 using a delivery status notification (DSN)—perhaps because the recipient does not exist—the MTA 134 will first deliver this message 117 to the BATV verify module 160. Module 160 will determine this is a delivery status notification by determining that the sender in the message envelope is null, and will then verify that the intended recipient is the same as the original sender by verifying that the signature in the incoming message is the correct one for the given recipient address. This verification is done at the SMTP session level, thus, if verification fails, the incoming DSN message will be rejected 170. If verification is successful, the recipient address is then converted from the unique signature back to the address of the real user 120, the message 118 is then delivered to the mail server 119 and finally delivered 121 to the actual user 120.

Unfortunately, there are problems with this proposed approach to countering a bounce e-mail attack. For one, the approach is very intrusive. Because the BATV sign module 150 replaces the actual sender address in the outgoing message envelope with the unique signature, the sender address at the session level and in the header will not be synchronized. This mismatch may cause the outgoing mail message to be blocked by a spam filter in any downstream MTA because many filters consider this kind of mismatch an indicator of spam. Secondly, the requirements for actual deployment of this method are rigorous. For one, this BATV approach must be deployed at the outside edge of the computer system because any internal policy match software depends upon sender and recipient addresses and will flag a mismatch when the sender's address is replaced with the unique signature. Also, for any incoming delivery status notification message, a normal recipient check will fail because of the BATV-modified address. Any BATV method that is integrated with a message security gateway product will require that the gateway product be deployed at the edge of the computer system; this may not be acceptable in many customer environments.

Thirdly, false positives may result when a BATV approach is used. The BATV approach requires that the sender in the message envelope must be null (as defined by the current BATV proposal) in order for the approach to work with all DSN messages. But, there exist some kinds of e-mail messages with a null sender in the envelope that are not DSN messages. These kinds of e-mail messages will be blocked by the BATV approach even though they are not spam. Fourthly, if any part of the signing and verification process does not work all DSN e-mail messages will be rejected. There is a time element applicable to the signing and verification process, thus it may be difficult to change one part of this process and still insure that no e-mail messages are lost. Finally, the BATV approach is susceptible to a capture/replay attack. If one of the outgoing sender addresses in an outgoing e-mail message is captured by an attacker, the attacker can then use this address to replay a bounce e-mail attack and this attack will not be blocked by the BATV verify module 160 since the verification will be successful.

Bounce Prevention with Message Tracking

Figure 3:
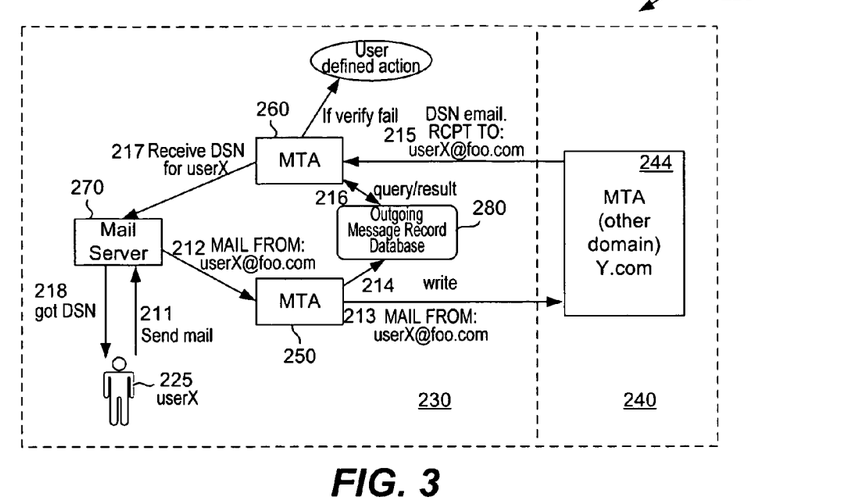
FIG. 3 illustrates a bounce prevention system using message tracking.

FIG. 3 illustrates a bounce prevention system 200 using message tracking. Shown is a user 225 utilizing a computer system 230 in order to send messages to, and receive messages from, another computer system 240, Y.com, having an MTA 244. Computer system 230 also includes an MTA 250 and 260, a mail server 270 and an outgoing message database 280. Each mail transfer agent (MTA) is a computer program or other software agent that transfers electronic mail messages from one computer to another as known in the art. Computer systems 230 in 240 are any suitable computer systems allowing a user to send and receive e-mail messages such as laptop computers, desktop computers, handheld computing devices or telephones, and networks of computers within enterprises. MTA 250 and 260 are shown in two separate parts because each incorporates different functionality, but this MTA may be a single software module. Mail server 270 is any suitable mail server as known in the art and is typically present in a computing device separate from a user's local computer, but may also be incorporated into the user computing device. Database 280 may be implemented using any suitable database, storage, or file system. Typically, user 225 and his or her computing device is a separate unit from a hardware device that incorporates MTA 250 and 260, mail server 270, and database 280, but it is contemplated that in certain environments, many of these modules may be located on the same computing device.

Basically, system 220 records information for every outgoing e-mail message sent from an internal user over the Internet to another domain, such as computer system 240. When a delivery status notification (DSN) message is received by the system it checks its own outgoing message database to determine if there is an associated outgoing message previously sent. If not, it is assumed the DSN is fake and it is deleted. If yes, the DSN is relayed to the next hop of the MTA or to the mail server. As known in the art, a delivery status notification message, as defined by RFC 1894, is a particular type of e-mail message that is used to notify the presumed sender of an e-mail message of any of several conditions related to the attempted delivery of the sender's e-mail message. The MTA may define the conditions needed to send a DSN. These conditions include: a failed delivery, a delayed delivery, a successful delivery, and delivery of the message via a gateway into an environment that may not support DSNs. An e-mail bounce attack typically results in a DSN and being sent to the fake sender address contained in the original e-mail attack message.

An outgoing message is handled by system 220 as follows. First, user 225 sends an e-mail message 211 through mail server 270 that is then sent on 212 to MTA 250. The MTA (or another suitable software module working in association with the MTA) then records a variety of information after the message has been sent 213 out to another domain, for example computer system 240 having MTA 244. This information is recorded 214 as a data record for each outgoing message in outgoing message database 280. This database may be contained within the mail transfer agent or may be a separate database.

Figure 4:
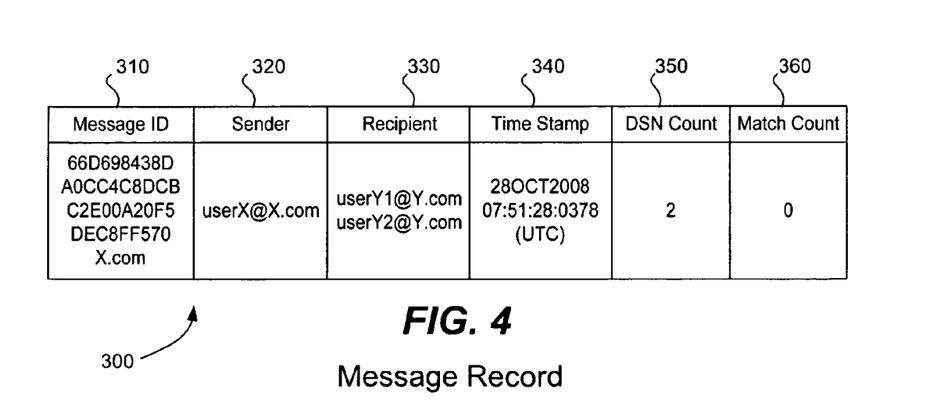
FIG. 4 illustrates a message record that is an example of information recorded for a single outgoing e-mail message.

FIG. 4 illustrates a message record 300 that is an example of information recorded for a single outgoing e-mail message. Included is a message identifier 310—a standard identifier that uniquely identifies an e-mail message sent from a computer system, a sender address 320, any number of recipient addresses 330 (in this case, two), a timestamp 340 indicating when the message was sent, a DSN count 350, and a match count 360. It is also possible to record this information while the message is being sent, or after the message has been sent, but recording the information after allows an accurate timestamp value to be recorded. The message identifier, sender and recipient addresses, and timestamp are information easily obtained from any associated mail processing module, from the message itself, or via the MTA.

The DSN count value 350 indicates, at most, how many DSNs may be received corresponding to this outgoing e-mail message and is determined based upon the number of recipients. For example, field 330 indicates that there are two recipients of this e-mail message; therefore, it can be expected that there will be at most only two DSNs received, assuming that both of the recipients do not exist. If any more DSNs are received, it is likely that these are spam. Therefore, the DSN count indicates the maximum value of likely legitimate returned messages. Working in conjunction with DSN count 350 is the value match count 360. This value starts off at zero and records how many DSNs have been received that match the outgoing record and is updated each time a new valid DSN is received. Thus, if the DSN count is two and then two valid DSNs are received, it is likely that any more DSNs matching this record are spam. These values shown record 300 are stored in database 280 (or any suitable file) and are accessible to MTA 250 or 260.

Figure 5:
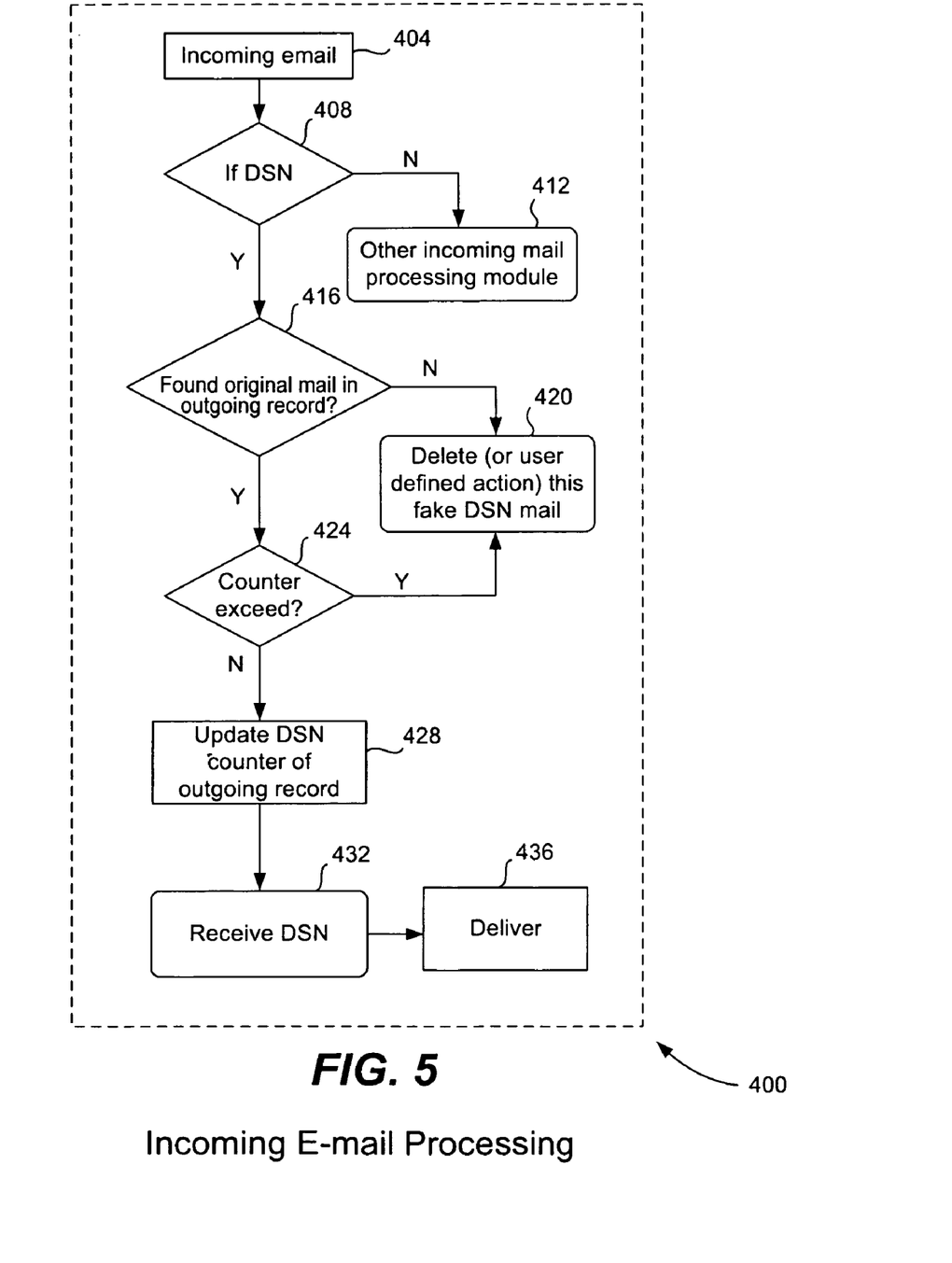
FIG. 5 is a flow diagram describing incoming message processing for the system.

FIG. 5 is a flow diagram describing incoming message processing for system 220. In this example it will be assumed that the message originally sent 213 from user 225 from computer system 230 has been rejected by computer system 240 and is being returned along with a delivery status notification e-mail message. In a first step 404 an incoming e-mail message 215 is received by MTA 260 within computer system 230. The MTA (or any suitable associated software module) first checks in step 408 whether or not this is a DSN message. This check may be performed by determining if the sender in the message envelope is null (which is one indicator of a DSN), or by checking the top-level content type of the message (i.e., multipart/report and report-type=delivery-status). Other techniques may also be used to determine if the message is a DSN such as checking the mail header, checking other fields such as message/delivery status, reporting-MTA, etc. Further details may be found in RFC 1891, section 7, and any or all of these techniques may be used to make an accurate determination that the message is a DSN.

Preferably, any type of DSN message yields a positive result, although it is possible to screen any incoming DSN messages by filtering out those that do not have specifically a "delivery failure" status (indicating that the recipient was not found). Other filters based upon the status of the DSN message may also be used.

In step 412 if the message is not a DSN then it is processed normally by any suitable incoming mail processing module such as by routing through the MTA and mail server for normal delivery. If the message is a DSN, then the mail transfer agent queries 216 the outgoing message database 280 in an attempt to find a matching outgoing message record. In other words, information associated with the returned e-mail message in the DSN is matched with records in database 280. The returned e-mail message is typically included as an attachment to the DSN so any of the fields 310-340 are available. Thus, the MTA fetches the original message identifier, the sender and recipient addresses and the original outgoing timestamp from the returned e-mail message, before querying database 280. The MTA may also query database 280 simply by using the header from the DSN message.

Preferably, the database 280 is searched for a message ID 310 matching the message ID of the returned e-mail message. Alternatively, the database may also be searched for a timestamp that matches exactly the outgoing timestamp of the returned e-mail message, or the database may be searched for sender or recipient addresses that match the sender and recipient addresses in the returned e-mail message. Of course, relying upon sender or recipient matches may yield a great deal of matches would have to be filtered, processed or further compared against other data in order to determine an exact match. If a match does not result in step 416 than this indicates that the DSN message is a fake and in step 420 a specific action is taken such as deleting this fake DSN message, or taking a specified user action such as quarantining the message, tagging the mail header, adding a customized X-header, etc.

On the other hand, if a match is found in step 416 between the returned e-mail message and one of the outgoing message records, this indicates that the message is being legitimately returned to the original sender and it is not spam. Accordingly, the DSN message may then be delivered to the user. Optionally, though, a check is performed in step 424 to determine if the DSN count 350 has been exceeded. This check is performed by comparing match count 360 against the DSN count. If the match count is greater than the DSN count, this indicates that more DSN messages have been received than there were original recipients, and that the current returned message (and any subsequent return messages) are likely to be part of a capture/replay attack. Because a capture/replay attack utilizes the same message (having the same message ID and other fields) it is likely that such an attack will yield a returned DSN message that will match a record in database 280. In this situation control also moves to step 420 and the DSN message is deleted or other action taken.

But, if the match count is the same as or less than the DSN count, then control moves to step 428 and the match count value 360 is incremented by one. Next, in step 432 the DSN message 217 is received for the user at mail server 270, and then the message is delivered in step 436 to user 225.

Accordingly, the bounce prevention system 220 provides numerous advantages in addition to preventing a e-mail bounce attack. For one, the first and second problems listed with respect to the BATV approach (too intrusive, rigorous requirements for deployment) do not exist with the present invention because the e-mail address of the sender is not replaced or modified. Second, the third problem with the BATV approach (false positives) is avoided because a determination of whether an incoming message is a DSN message is not only based upon the sender information in the envelope. All available data is used, including SMTP session data and e-mail data, to determine if an incoming message is a DSN message. Preferably, if an upstream MTA follows RFC 3461 from the Network Working Group entitled "Simple Mail Transfer Protocol (SMTP) Service Extension for Delivery Status Notifications (DSNs)" (hereby incorporated by reference) then a determination is easier.

Third, the system can handle capture/replay attacks using counters 350 and 360, thus the fifth problem associated with the BATV approach (susceptible to capture/replay attacks) is handled. Fourth, deployment of system 220 is not required to be at an outside edge of any computer system (as is a BATV approach). System 220 needs simply to be on the path of outgoing and incoming e-mail messages. Fifth, because a DSN message will include all of the session and e-mail data, it is possible to retrieve the information regarding any original attacker. Sixth, any capture/replay attack will be detected and then an audit may be performed on the suspect e-mail message.

Further, only outgoing mail message data need be recorded for e-mail to other domains, not for messages within a single domain, thus performance will not suffer greatly. In addition, because a returned DSN message is only likely within a time window of several days, it will only be necessary to store outgoing message records for a period of days rather than weeks or months. The number of days recommended to keep this information is a configurable value; we recommend greater than two days, and a good default value can be five days.

Computer System Embodiment

Figure 6A:
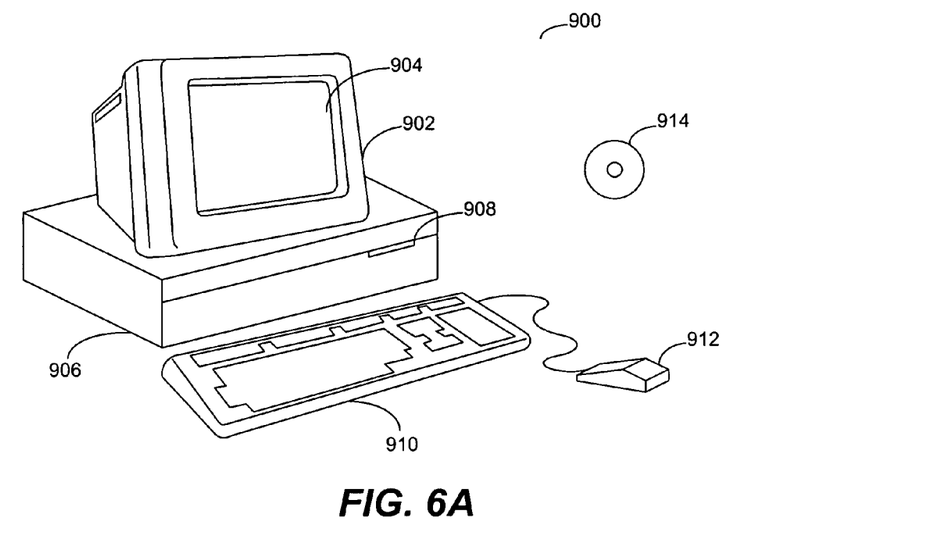
FIGS. 6A and 6B illustrate a computer system suitable for implementing embodiments of the present invention.
Figure 6B:
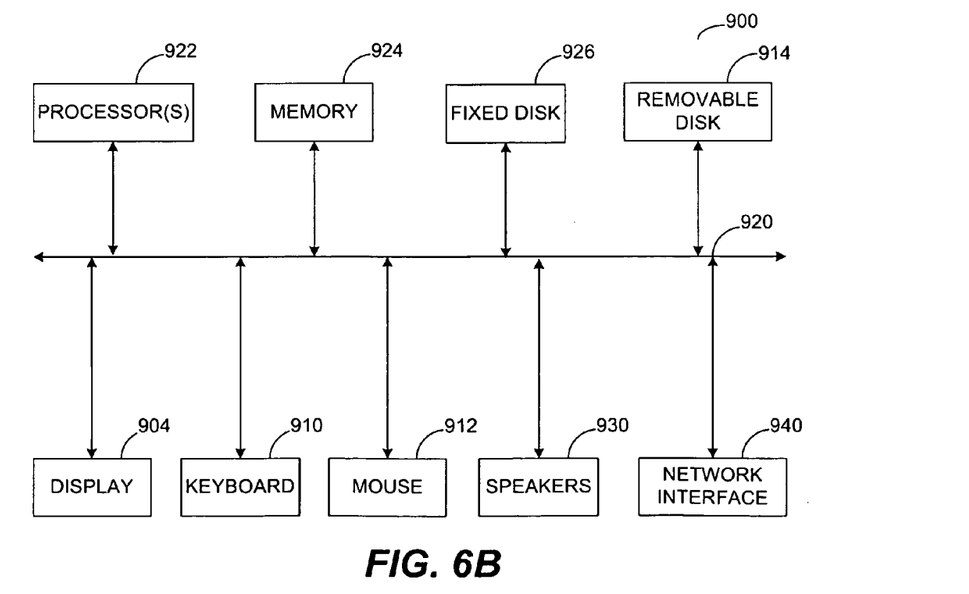

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of sending an e-mail message from a computer system to prevent an e-mail bounce attack, said method comprising:
   receiving, within said computer system, an e-mail message from a user within said computer system of a first domain, said e-mail message addressed to at least one recipient in a second domain different from said first domain;
   retrieving from said e-mail message a message identifier and a list of recipient addresses;
   storing said message identifier from said e-mail message in a record of a database in said computer system;
   setting a DSN (delivery status notification) counter of said record to a value equivalent to the number of recipient addresses in said list of recipient addresses; and
   delivering said e-mail message from said first domain to at least said recipient in said second domain after said receiving and retrieving.

2. A method as recited in claim 1 further comprising:
   deleting said record from said database after 30 days.

3. A method as recited in claim 1 wherein said local database only includes records reflecting outgoing e-mail messages that have previously been sent from said computer system.

4. A method as recited in claim 1 wherein said steps of retrieving and storing are performed by a mail transfer agent of said computer system.

5. A method as recited in claim 1 further comprising:
   storing a sender address and a timestamp from said e-mail message in said record of said database in said computer system.

6. A method as recited in claim 1 wherein said message identifier uniquely identifies said e-mail message from said computer system.

7. A method as recited in claim 1 further comprising:
   storing said message identifier in said record after said e-mail message has been sent successfully.

8. A method as recited in claim 1 further comprising:
   delivering said e-mail message from said first domain to at least said recipient in said second domain after said steps of storing and setting.

9. A method of receiving an e-mail message to detect an e-mail bounce attack, said method comprising:
   receiving a DSN (delivery status notification) message within a computer system that includes information regarding an e-mail message originally sent from a sender to a recipient;
   searching a local database of said computer system for a record having information including a stored message identifier that matches with an incoming message identifier of said e-mail message information from said DSN message;
   determining that such a match exists when said stored message identifier matches with said incoming message identifier, said information of said record having been stored prior to said receiving;
   identifying a sender e-mail address for said sender within said computer system; and
   delivering said DSN message to said sender at said sender e-mail address within said computer system.

10. A method as recited in claim 9 further comprising:
    searching said local database for said record having a stored timestamp that matches with an incoming timestamp of said e-mail message; and
    determining that said match exists when said stored timestamp matches with said incoming timestamp.

11. A method as recited in claim 9 wherein said local database includes records uniquely identifying outgoing e-mail messages that have previously been sent from said computer system.

12. A method as recited in claim 9 wherein said steps of searching and determining are performed by a mail transfer agent of said computer system.

13. A method as recited in claim 9 further comprising:
    determining whether said DSN message is a true DSN message based upon the envelope of said DSN message and SMTP session data.

14. A method as recited in claim 9 further comprising:
    before said receiving, storing said e-mail message information in said local database and sending said e-mail message from said sender to said recipient.

15. A method of receiving an e-mail message to detect an e-mail bounce attack, said method comprising:
    receiving an apparent DSN (delivery status notification) message within a computer system that includes information regarding an e-mail message originally sent from a sender to a recipient;
    searching a local database of said computer system for a record having information including a stored message identifier that matches with an incoming message identifier of said e-mail message information from said DSN message, wherein said local database includes records uniquely identifying outgoing e-mail messages that have previously been sent from said computer system;
    determining that such a match does not exist when no stored message identifier matches with said incoming message identifier;
    determining that said received DSN message is a faked message; and
    taking an action with respect to said apparent DSN message that does not include delivering said DSN message to said sender within said computer system.

16. A method as recited in claim 15 further comprising:
    searching said local database for a record having a stored timestamp that matches with an incoming timestamp of said e-mail message; and
    determining that said a match does not exist when no stored timestamp matches with said incoming timestamp.

17. A method as recited in claim 15 wherein said steps of searching and determining are performed by a mail transfer agent of said computer system.

18. A method as recited in claim 15 further comprising:
    determining whether said DSN message is a DSN message based upon the envelope of said DSN message and SMTP session data.

19. A method of receiving an e-mail message to detect an e-mail bounce attack, said method comprising:
    receiving a DSN (delivery status notification) message within a computer system that includes information regarding an e-mail message originally sent from a sender to a recipient;
    searching a local database of said computer system for a record having information that matches with said e-mail message information from said DSN message;
    determining that such a match exists, said information of said record having been stored prior to said receiving;

incrementing a match count value in said matched record of said local database;

determining that a replay attack has occurred when said match count value is greater than a DSN count value in said matched record of said local database;

identifying a sender e-mail address for said sender within said computer system; and delivering said DSN message to said sender at said sender e-mail address within said computer system.

20. A method as recited in claim 19 further comprising:

before said receiving, storing said e-mail message information in said local database and sending said e-mail message from said sender to said recipient.

* * * * *